US 12,157,989 B2
Dec. 3, 2024

(12) United States Patent
Lister et al.

(10) Patent No.: US 12,157,989 B2
(45) Date of Patent: Dec. 3, 2024

(54) ELECTRIC POWERTRAIN WITH RIMPULL TORQUE LIMIT PROTECTION

(71) Applicant: Caterpillar Inc., Peoria, IL (US)

(72) Inventors: Brian E. Lister, Edwards, IL (US); Michael D. Beyer, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 237 days.

(21) Appl. No.: 17/965,939

(22) Filed: Oct. 14, 2022

(65) Prior Publication Data

US 2024/0125092 A1 Apr. 18, 2024

(51) Int. Cl.
*E02F 9/20* (2006.01)
*B60L 15/20* (2006.01)
*B60L 53/20* (2019.01)
*F16H 61/14* (2006.01)

(52) U.S. Cl.
CPC .............. *E02F 9/207* (2013.01); *B60L 15/20* (2013.01); *B60L 53/20* (2019.02); *E02F 9/2079* (2013.01); *F16H 61/14* (2013.01)

(58) Field of Classification Search
CPC ......... E02F 9/207; E02F 9/2079; B60L 15/20; B60L 53/20; B60L 15/2054; F16H 61/14
See application file for complete search history.

(56) References Cited

U.S. PATENT DOCUMENTS

| | | | |
|---|---|---|---|
| 4,663,713 A | 5/1987 | Cornell et al. | |
| 6,234,254 B1 * | 5/2001 | Dietz | A01B 67/00 172/3 |
| 7,766,791 B2 | 8/2010 | Bruce | |
| 8,700,276 B2 * | 4/2014 | Velde | B60W 10/11 701/51 |
| 9,573,583 B2 | 2/2017 | Rindfleisch et al. | |
| 10,029,569 B2 | 7/2018 | Bakken et al. | |
| 10,793,124 B2 * | 10/2020 | Zhao | B60K 7/0007 |
| 10,981,570 B2 * | 4/2021 | Goli | F16H 59/44 |
| 2010/0131164 A1 * | 5/2010 | Carter | B60L 50/52 701/61 |
| 2011/0130903 A1 * | 6/2011 | Heisel | B60W 30/192 903/906 |
| 2015/0105950 A1 * | 4/2015 | Fleege | B60L 15/2054 701/22 |
| 2016/0160471 A1 * | 6/2016 | Kishimoto | B60K 6/365 180/65.265 |
| 2018/0015927 A1 * | 1/2018 | Mitchell | E02F 9/0841 |
| 2021/0252983 A1 * | 8/2021 | Nahrwold | B60L 58/12 |
| 2021/0294343 A1 * | 9/2021 | Walker | B60W 40/105 |
| 2022/0281324 A1 * | 9/2022 | Wang | B60K 1/00 |

* cited by examiner

*Primary Examiner* — Abdalla A Khaled
(74) *Attorney, Agent, or Firm* — Leydig, Voit & Mayer, LTD.

(57) ABSTRACT

An electric powertrain includes an electric power source, an electric motor and a multi-speed transmission. The powertrain has an electronic controller. The controller determines a respective rimpull torque limit for the operating gear of the multi-speed transmission and determines whether the rimpull torque demand exceeds the rimpull torque limit. Upon determining that the rimpull torque demand exceeds the rimpull torque limit, the controller acts to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

20 Claims, 4 Drawing Sheets

ELECTRIC POWERTRAIN WITH RIMPULL TORQUE LIMIT PROTECTION

TECHNICAL FIELD

This patent disclosure relates generally to a machine having an electric powertrain and, more particularly, to an electric powertrain with a multi-speed transmission and a rimpull limit protection system.

BACKGROUND

Many machines used in construction and mining environments include a powertrain for actuating traction devices, for example tires. More specifically, these powertrains typically include a power source that provides torque through a transmission to one or more of the traction devices of the machine. An internal combustion engine is a commonly used power source in the powertrain of such machines. The maximum transmission output of the powertrain is generally a function of the maximum engine capability applied across the various gear ratios in the transmission. An internal combustion engine has a limited range of input speed and torque to the transmission that is dictated by the inability of the internal combustion engine to operate below a low idle speed. Thus, the minimum operating speed inherent to the internal combustion engine creates a minimum transmission input speed design criteria below which the transmission will never operate. As a result, there is a natural torque limit for each gear that is defined by the minimum idle speed of the internal combustion engine.

Internal combustion engines may emit undesirable exhaust emissions and other pollutants during operation. Moreover, increasing fuel efficiency of machines has also become of increased importance, for example, because of the rising costs associated with fossil fuels. One solution to these issues is a powertrain utilizing an electric motor to provide torque to the traction devices of the machine. However, the use of an electric motor in a powertrain of a machine can raise other challenges. For example, providing an electric motor of sufficient size to meet the torque and speed demands of a machine can be expensive.

One way to reduce the required size of the electric motor is through the use of a multi-speed transmission. However, using a multi-speed transmission to deliver torque from an electric motor raises other issues. For instance, electric motors generally have no lower speed limit and thus have greater capability across the motor's full speed range as compared to an internal combustion engine. Batteries used to power electric motors are not limited by speed. The batteries can output full power at zero speed. Thus, unlike an internal combustion engine, an electric motor can produce a high torque at zero speed. As a result, when using a multi-speed transmission with an electric motor, it is possible that each of the gears of the multi-speed transmission could be exposed to the relatively high motor torques associated with low motor speeds. However, constructing the geartrain of the transmission so as to be able to withstand such torques is very expensive.

U.S. Pat. No. 7,766,791 ("the '791 patent"), assigned to the assignee of the present application, describes a powertrain for a machine with a transmission, a differential coupled to the transmission and a clutch associated with the differential. The clutch and differential are configured to selectively reduce a total traction available to the machine by releasing the differential as a function of a torque produced by the power source. More specifically, the powertrain arrangement of the '791 patent is focused on limiting the torque applied to the powertrain by employing an inter-axle open differential to reduce traction of the machine in order to prevent a potentially damaging torque from being introduced into a powertrain. The '791 patent, however, fails to appreciate the problems associated with potentially damaging torques resulting from the use of a multi-speed transmission with an electric motor in the powertrain of a machine.

SUMMARY

The disclosure describes, in one aspect, an electric powertrain for driving a traction device of a machine. The electric powertrain includes an electric power source, an electric motor operably coupled to the electric power source and a multi-speed transmission operably coupled to the electric motor. The multi-speed transmission is operable to shift between a plurality of gears each configured to adjust an electric motor output speed and an electric motor output torque to a respective transmission output speed and transmission output speed range. The electric powertrain also includes an electronic controller. The electronic controller is configured to receive a first signal indicating rimpull torque demand of the electric powertrain, the rimpull torque demand having an associated electric motor torque command. The electronic controller is also configured to receive a second signal indicating an operating gear in which the multi-speed transmission is operating. The electronic controller determines a respective rimpull torque limit for the operating gear of the multi-speed transmission. The electronic controller determines whether the rimpull torque demand exceeds the rimpull torque limit. Upon determining that the rimpull torque demand exceeds the rimpull torque limit, the electronic controller acts to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

In another aspect, the disclosure describes a machine including a machine frame and at least one traction device supported on the machine frame. An electric powertrain is supported on the machine frame for driving the at least one traction device. The electric powertrain includes an electric power source, an electric motor operably coupled to the electric power source and a multi-speed transmission operably coupled to the electric motor. The multi-speed transmission is operable to shift between a plurality of gears each configured to adjust an electric motor output speed and an electric motor output torque to a respective transmission output speed and transmission output speed range. The electric powertrain also includes an electronic controller. The electronic controller is configured to receive a first signal indicating rimpull torque demand of the electric powertrain, the rimpull torque demand having an associated electric motor torque command. The electronic controller is also configured to receive a second signal indicating an operating gear in which the multi-speed transmission is operating. The electronic controller determines a respective rimpull torque limit for the operating gear of the multi-speed transmission. The electronic controller determines whether the rimpull torque demand exceeds the rimpull torque limit. Upon determining that the rimpull torque demand exceeds the rimpull torque limit, the electronic controller acts to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

In yet another aspect, the disclosure describes a method for controlling an electric powertrain of a machine. The electric powertrain includes an electric power source, an electric motor, and a multi-speed transmission operable to shift between a plurality of gears each configured to adjust an electric motor output speed and an electric motor output torque to a respective transmission output speed and transmission output speed range. The method includes receiving a first signal indicating rimpull torque demand of the electric powertrain, the rimpull torque demand having an associated electric motor torque command and receiving a second signal indicating an operating gear in which the multi-speed transmission is operating. The method further includes determining a respective rimpull torque limit for the operating gear of the multi-speed transmission and determining whether the rimpull torque demand exceeds the rimpull torque limit. Upon determining that the rimpull torque demand exceeds the rimpull torque limit, the method includes acting to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

DETAILED DESCRIPTION

Figure 1:
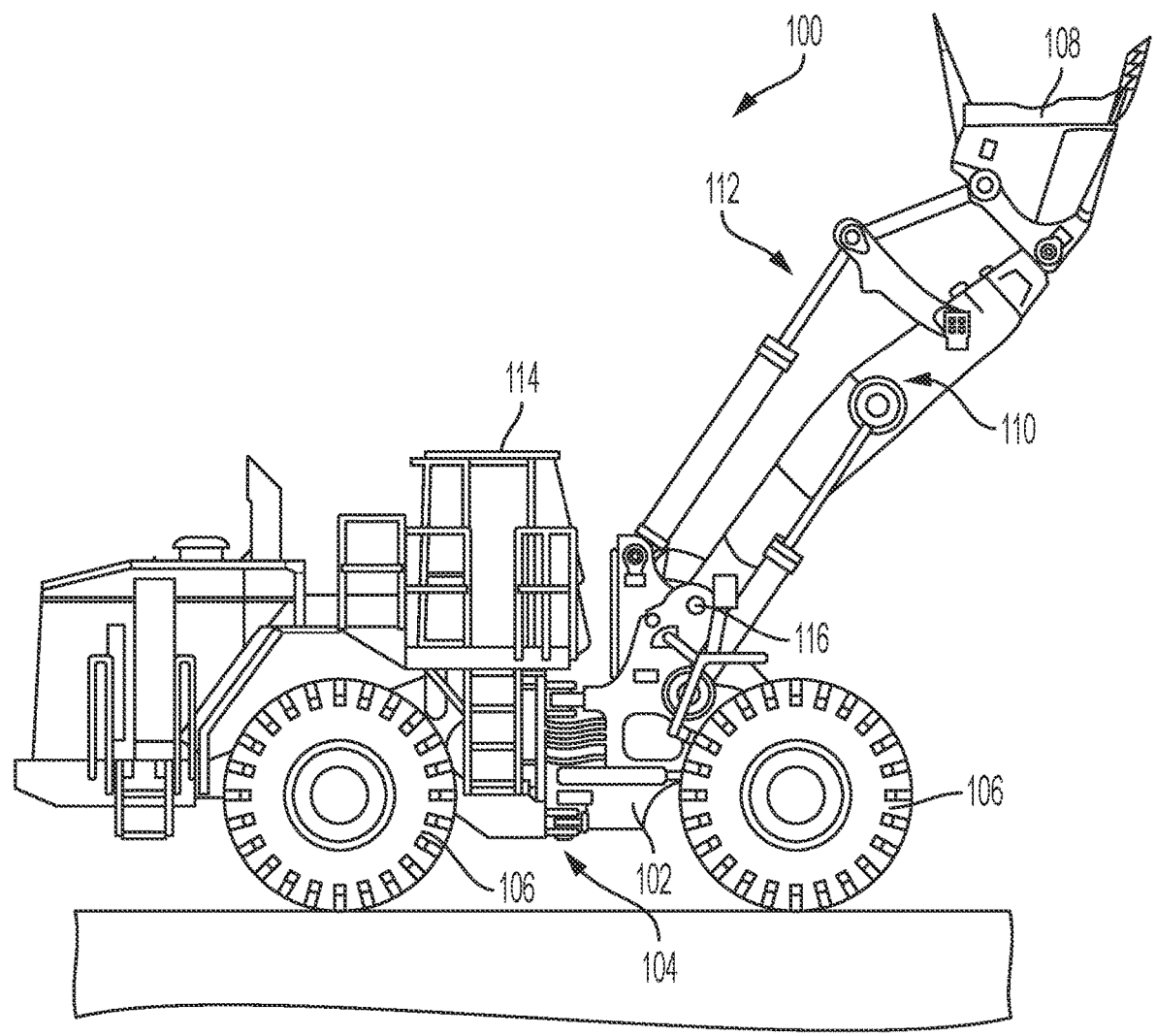
FIG. 1 is a side elevation view of an exemplary machine having an electric powertrain in accordance with the disclosure.

Now referring to the drawings, wherein whenever possible like reference numbers will refer to like elements, there is illustrated in FIG. 1 a mobile machine 100 in the particular embodiment of a wheel loader for, in this case, loading, transporting, and delivering material about a worksite. However, while the present disclosure focuses on a mobile machine 100 in the embodiment of a wheel loader aspects of the disclosure may be applicable to other types of mobile machines that perform some type of operation in association with an industry such as mining, construction, farming, transportation or the like. For example, the mobile machine 100 may be an off-highway truck, a motor grader or other material moving machine that is configured to move about a work environment.

In the illustrated embodiment, the machine 100 includes a machine frame 102. To facilitate maneuverability such as making sharp turns, the machine frame 102 may be an articulated frame wherein the forward end and the rearward end are pivotally joined at an articulated joint 104. To enable the machine 100 to move about a work surface in a mobile manner, the machine frame 102 can be supported on a plurality of traction devices 106 such as rotatable wheels that can include rubber tires. The wheels may be designated as powered drive wheels to propel the machine 100, steerable wheels to adjust direction of the wheel loader, or combinations thereof. Other suitable embodiments of machines may include different traction devices 106 such as continuous tracks that include a closed belt disposed about rollers and/or sprockets, whereby translation of the belt carries the machine over the work surface.

To accommodate material during operation, the machine 100 can include a work tool 108, a bucket in the illustrated embodiment, that in this case is operatively associated with a lifting mechanism 110 that can vertically raise and lower the work tool 108 with respect to a work surface. The lifting mechanism 110 can be a mechanical linkage assembled from a plurality of rigid links connected by pivotal joints that can articulate and move with respect to each other to controllably displace or reposition the work tool 108. In particular, the work tool 108 can be pivotally disposed at the distal end of the lifting mechanism 110 which in turn may be pivotally connected (via pivot joint 116) to the forward end of the machine frame 102. A tilt mechanism 112 may also be provided to pivot the work tool 108 relative to the lift mechanism 110. In other embodiments of mobile machines, it will be appreciated that the work tool 108 may be different than a bucket such as, for example, a fork, a blade, a drilling auger, and the like.

In an embodiment, to accommodate an operator and/or the operator input devices or controls for operation of the machine, the machine 100 can include an onboard operator cab 114. For example, the input devices in the operator cab 114 can include travel inputs that control mobile travel of the machine 100 and lift inputs that can manipulate the work tool 108. Examples of travel inputs and lift inputs can include hand wheels, joysticks, pedals, levers, knobs, keypads, etc. The travel inputs can be configured to increase or decrease the travel velocity of the machine 100 with respect to the travel direction to speedup, slow, and/or stop travel of the machine.

Figure 2:
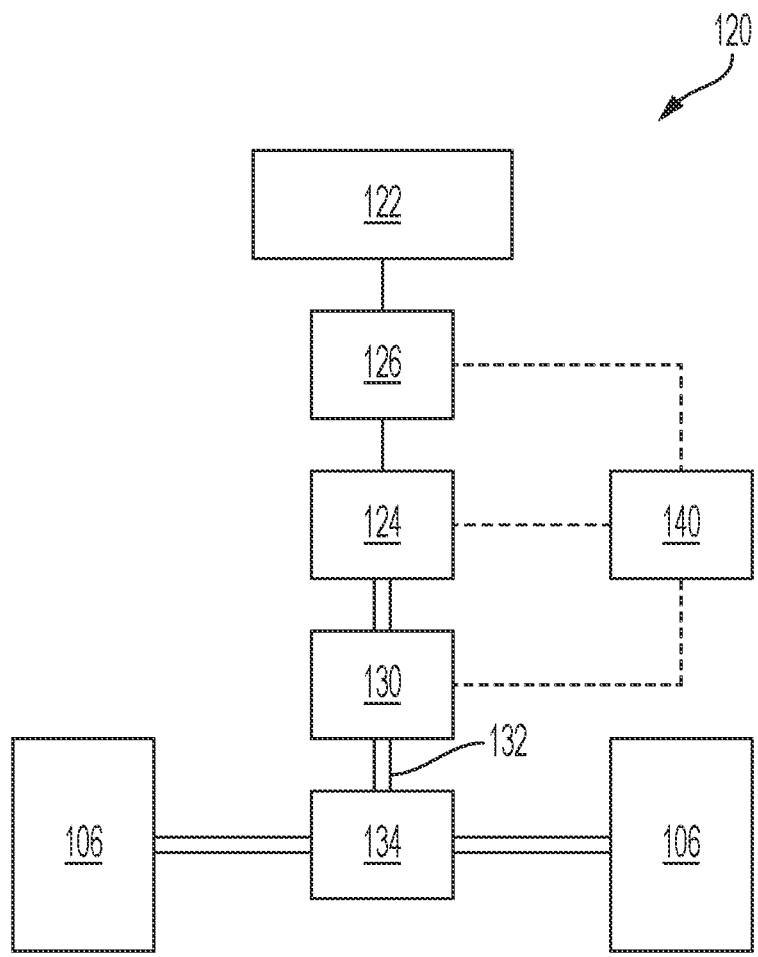
FIG. 2 is a schematic illustration of an electric powertrain for the machine of FIG. 1.

Referring to FIG. 2, for providing power to one or more of the traction devices 106, the machine 100 includes an electric powertrain 120. The illustrated electric powertrain 120 includes an electric power source 122, which can comprise, for example, a battery pack supported on the machine frame 102. The battery pack may include one or more rechargeable batteries that store electric energy, which may be used to drive operation of the electric powertrain 120 of the machine 100. In other embodiments, the electric power source 122 may utilize electricity supplied from, for example, an internal combustion engine operating in series with an associated electric generator, or a fuel cell.

The electric powertrain 120 further includes an electric motor 124 also supported on the machine frame 102. In particular, the electric powertrain 120 may be configured such that the electric power source 122 provides electric energy to power the electric motor 124. Although referred to in the singular, more than one electric motor 124 may be used such as, for example, two or more electric motors mechanically combined via a gear or gear train. The electric motor 124 may be any known AC or DC motor such as, permanent magnet, induction, switched-reluctance, or a hybrid configuration of the above, and may also be sealed, brushless, and/or liquid-cooled. Furthermore, in some embodiments, the electric motor 124 may be configured and controlled such that the machine 100 may be slowed while using the electric motor 124 as a generator, thereby converting kinetic energy associated with the wheel loader into electric energy that may be stored in the electric power source 122 or other electric power storage device.

In the illustrated embodiment, the electric motor 124 has an associated inverter 126 that is configured to convert and control electricity supplied to the electric motor 124 by the electric power source 122. For example, the inverter 126 may be configured to control the frequency of the electric power supplied to the electric motor 124 to thereby control the rotation speed and output torque of the motor.

To further adjust the speed and or torque produced by the electric motor 124, the electric powertrain 120 can include a multi-speed transmission 130. More specifically the multi-speed transmission 130 may include a geartrain or gearbox supported on the machine frame 102 that facilitates regulation and transfer of power generated by the electric motor 124 to the traction devices 106 of the machine 100. The multi-speed transmission 130 may be adapted to be operably coupled to the electric motor 124. Such coupling may be exemplarily attained by selective use of one or more clutches, such as a forward travel clutch and a reverse travel clutch. Like the power source 122 and electric motor 124, the multi-speed transmission 130 may be supported on the machine frame 102.

The multi-speed transmission 130 may define multiple distinct gear ranges that may enable the machine 100 to attain motion in both the forward direction and reverse direction. For example, the multi-speed transmission 130 may be configured to adjust the output speed and torque from the electric motor 124 to multiple ranges or settings such as two, three, four or more forward output speed and torque ranges and one rearward speed and torque range.

The multi-speed transmission 130 may also include a transmission output shaft 132 through which power output (e.g., rotary power output) received from the electric motor 124 may be delivered to further components of the electric powertrain 120. The transmission output shaft 132 may, in turn, be operably coupled to a differential 134. The differential 134 may be configured to then further deliver the power output to the traction devices 106 to facilitate motion of the machine 100.

To facilitate controlled operation of the electric powertrain 120, the electric powertrain 120 can be operatively associated with a control system embodied in an electronic controller 140, sometimes referred to as an electronic control module (ECM) or an electronic control unit (ECU). The electronic controller 140 can be a programmable computing device and can include one or more microprocessors for executing software instructions and processing computer readable data. Examples of suitable microprocessors include programmable logic devices such as field programmable gate arrays ("FPGA"), dedicated or customized logic devices such as application specific integrated circuits ("ASIC"), gate arrays, a complex programmable logic device, or any other suitable type of circuitry or microchip. To store application software and data for the controlled operation of the electric powertrain, the electronic controller 140 can include a non-transitory computer readable and/or writeable memory, for example, read only memory ("ROM"), random access memory ("RAM"), EPROM memory, flash memory, or another more permanent storage medium like magnetic or optical storage. To interface and network with other operational systems on the machine 100, the electronic controller 140 can include an input/output interface to electronically send and receive non-transitory data and information. The input/output interface can be physically embodied as data ports, serial ports, parallel ports, USB ports, jacks, and the like to communicate via conductive wires, cables, optical fibers, or other communicative bus systems via any suitable communication protocol such as CAN Bus, WiFi, Bluetooth, or cellular communication standards. The electronic controller 140 may be associated with other software including any suitable instruction sets, programs, applications, routines, libraries, databases and the like, for carrying out its functions. Although in FIG. 2, the electronic controller 140 is illustrated as a single, discrete unit, in other embodiments, the electronic controller 140 and its functions may be distributed among a plurality of distinct and separate components, including various components and functionalities located onboard the machine 100 and/or at an off-board operator station.

In this case, the electronic controller 140 is in communication with the inverter 126, the electric motor 124 and the multi-speed transmission 130. The data lines of the electronic communications network between the electronic controller 140 and these systems of the electric powertrain 120 are represented by dashed lines in FIG. 2 and may be embodied as a CAN bus or similar protocols and may utilize conductive wires or fiber optics as the physical transmission media.

To protect the electric powertrain 120 from damage or other issues associated with excessive torques, the electronic controller 140 may be configured to limit the rimpull torque produced by the multi-speed transmission 130 under certain circumstances. Specifically, the electronic controller 140 may be configured to apply a predetermined limit to the rimpull torque in one or more of the gears in which the multi-speed transmission 130 operates. This rimpull torque limit is a function of the gear in which the multi-speed transmission 130 is operating and represents a maximum rimpull torque for that particular gear that the electronic controller 140 will permit the multi-speed transmission 130 to produce. Upon receipt of a rimpull torque demand that exceeds the rimpull torque limit, the electronic controller 140 may be configured to direct the multi-speed transmission 130 to downshift into a gear in which the rimpull torque limit is below the rimpull torque demand. Alternatively, if a lower gear is not available for some reason (e.g., failure of one or more of the lower gears, or the multi-speed transmission 130 is already in the lowest gear), the electronic controller 140 may be configured to limit the torque command to the electric motor 124.

Desired rimpull torque can be considered a machine performance metric that is a function of ground speed of the machine 100. When configuring the electric powertrain 120, each gear of the multi-speed transmission 130 will have a theoretical peak rimpull torque based on the max torque (at a given speed) operating envelope multiplied by the gear ratio. In general, this peak rimpull curve may exceed the desired rimpull curve because the available torque/speed envelope of the electric motor 124 is not a perfect match to the multi-speed transmission 130. As a result, the desired rimpull curve of the machine can be a limit on the theoretical peak rimpull torque capability of the machine. The rimpull torque limit of the present disclosure does not refer to (or include) this potential difference between the desired rimpull torque and the peak rimpull torque.

Figure 3:
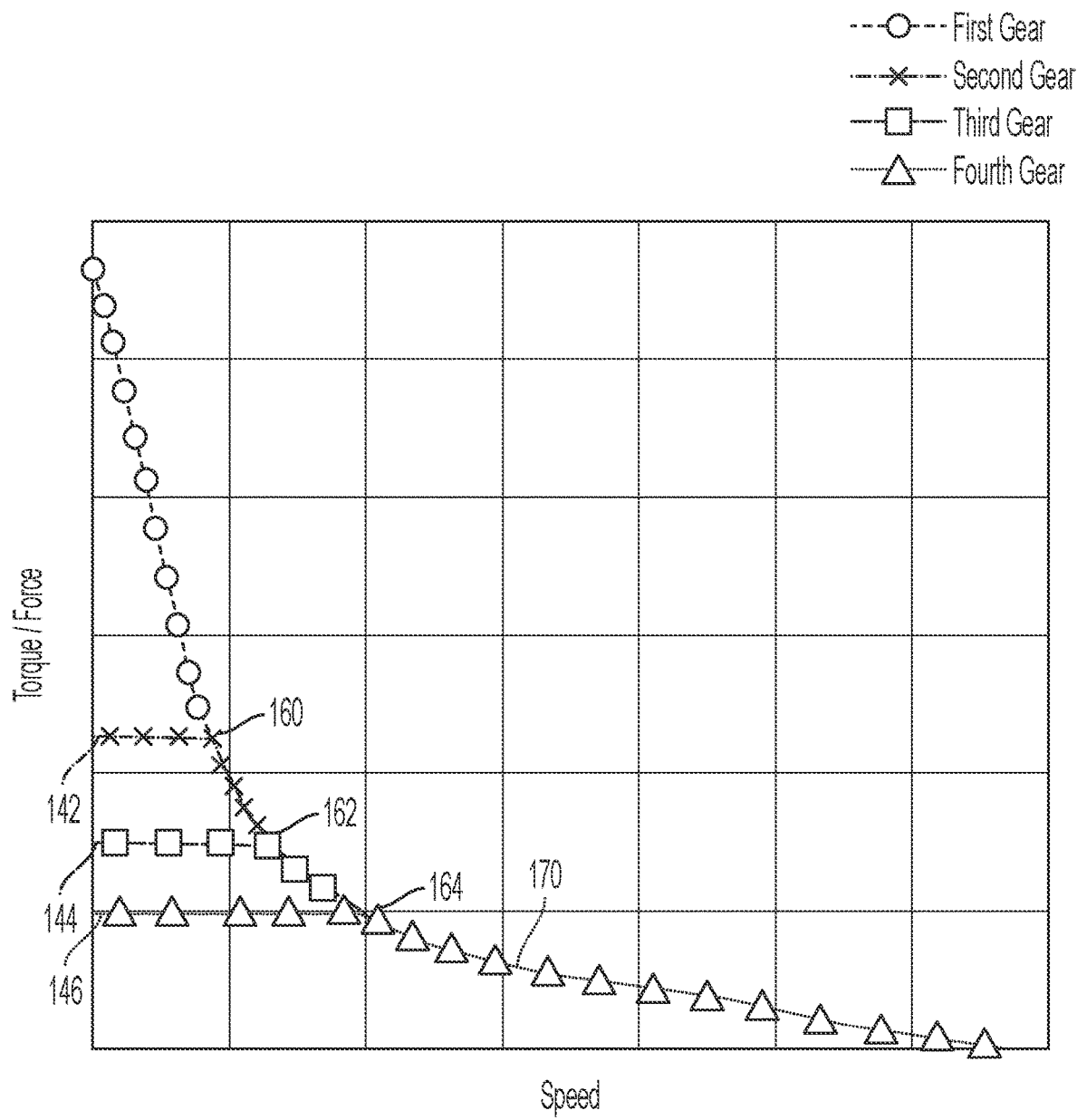
FIG. 3 is an exemplary plot of speed versus rimpull torque for the electric powertrain of FIG. 2.

FIG. 3 provides an exemplary plot of transmission output speed versus rimpull torque for an electric powertrain 120 having four gears. In the example illustrated in FIG. 3, a respective rimpull torque limit is applied to each of the second, third and fourth gears of the multi-speed transmission 130. The rimpull torque limit is represented by a horizontal line (referenced as 142 for second gear, 144 for third gear and 146 for fourth gear) at the low speed end of the curve for each gear that shows how the rimpull torque stops increasing below a given transmission speed. These transmission speeds can correspond with normal downshift points in each discrete gear. The rimpull torque limit is particularly applicable at speeds below those normal downshift points (referenced in FIG. 3 as 160 for the downshift point between first and second gear, 162 for the downshift point between second and third gear and 164 for the downshift point between third and fourth gear). The rimpull torque limit is generally below the maximum rimpull torque capability of the electric motor 124. There is no rimpull torque limit on first gear in the embodiment illustrated in FIG. 3, although in some embodiments first gear may also have a rimpull torque limit.

For example, in a situation where the machine 100 is slowing from its maximum ground speed, the multi-speed transmission 130 and electronic controller 140 are designed to downshift into successively lower gears at the appropriate shift points (e.g., 160, 162 and 164 in FIG. 3) so that the multi-speed transmission 130 produces the desired rimpull curve (which can be considered to be the smooth, continuous curve (referenced as 170) of FIG. 3 minus the horizontal rimpull torque limit lines 142, 144, 146). If the multi-speed transmission 130 does not downshift for some reason, the desired rimpull torque from the perspective of the machine will continue to increase with decreasing ground speed. In such a case, the electronic controller 140 will limit the rimpull torque to the rimpull torque limit 142, 144, 146 for the currently engaged gear (based on the nominal transmission shift points 160, 162, 164) ignoring the command to increase the rimpull torque associated with the slowing ground speed of the machine.

Rimpull torque is the force at the point of connection between the traction device and the ground. Rimpull torque and transmission output torque are functionally equivalent with the rimpull torque representing the force that a given transmission output torque produces at the traction device. Herein, rimpull torque and transmission output torque are used interchangeably.

INDUSTRIAL APPLICABILITY

The present disclosure is applicable to any type of electric powertrain. The present disclosure is particularly applicable to electric powertrains having electric motors and multi-speed transmissions. For example, the rimpull torque limit of the present disclosure allows one or more gears of the multi-speed transmission to be designed to withstand torques that are less than the full output torque capability of the electric motor. This rimpull torque limit system can protect the multi-speed transmission from damage as well as excessive wear and tear and associated durability problems. This can also significantly reduce the cost of the multi-speed transmission as the rimpull torque limit system can reduce the need for a hardened design of the multi-speed transmission in which each of the gears and associated transmission structures can withstand the full torque capabilities of the electric motor. The reduced rimpull torque can also signal to the operator of the machine that there is, for example, a fault in the multi-speed transmission that is causing it fail to properly downshift.

Figure 4:
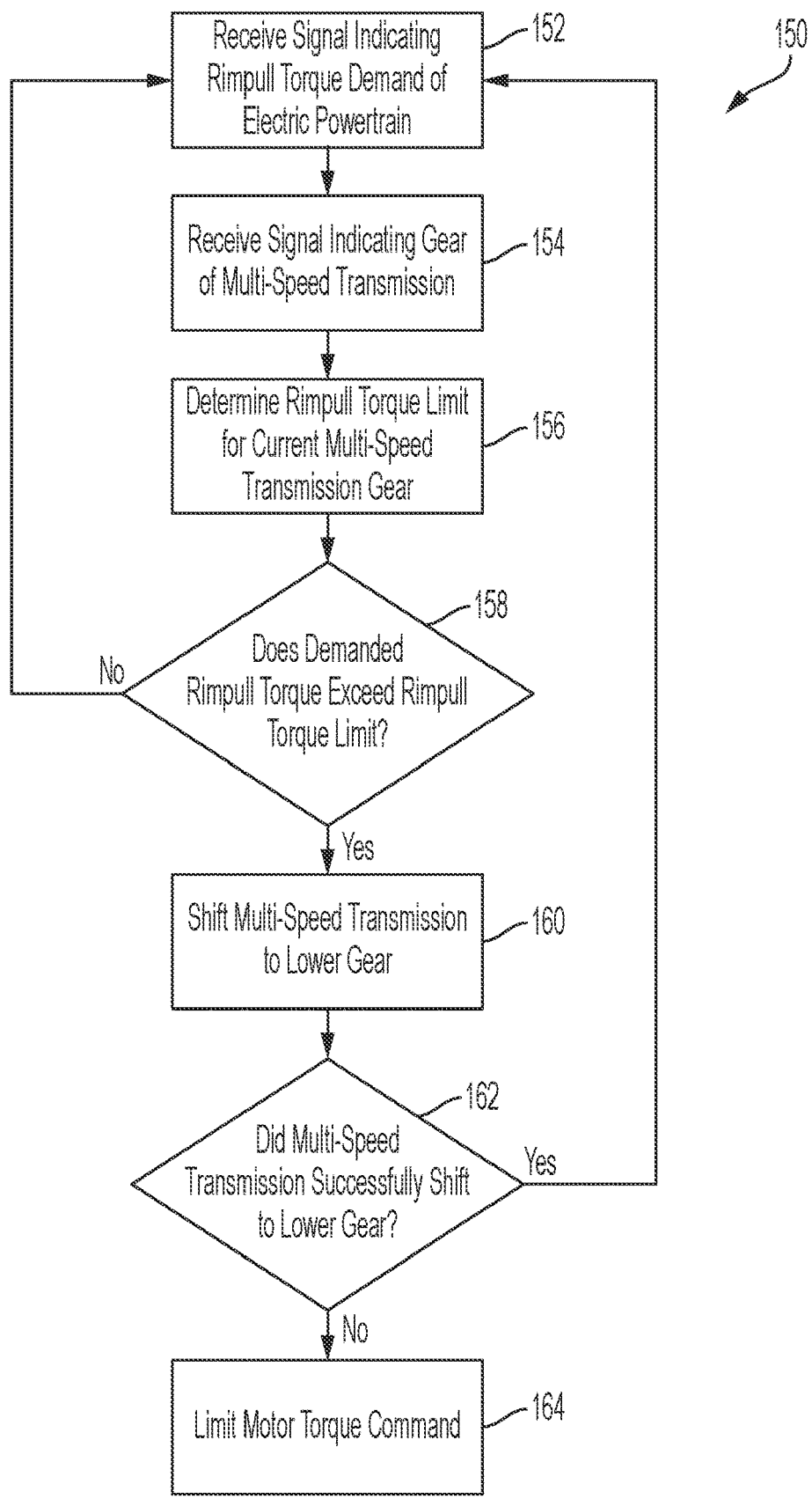
FIG. 4 is a flow chart illustrating an exemplary method for controlling the electric powertrain of FIG. 2.

Referring to FIG. 4 and in general accordance with the prior figures, there is illustrated an exemplary process 150 for applying a rimpull torque limit on the electric powertrain 120 that may be executed by the electronic controller 140. The process 150 depicted in the flow diagram for accomplishing these tasks may include a series of steps or instructions implemented as non-transitory computer executable software code in the form of an application or program that is run by the electronic controller 140. It will be appreciated that the steps of the process 150 do not necessarily have to be performed in the sequence illustrated in FIG. 4.

In step 152 of the process 150, the electronic controller 140 receives a signal indicating a rimpull torque demand of the electric powertrain 120. For example, this rimpull torque demand may be initiated by an operator of the machine 100. In step 154, the electronic controller 140 receives a signal (e.g., from the multi-speed transmission) indicating the gear in which the multi-speed transmission 130 is currently operating. Next, in step 156, the electronic controller 140 determines the applicable rimpull torque limit for the current gear of the multi-speed transmission 130. For example, the applicable rimpull torque limits for each gear of the multi-speed transmission 130 may be saved in a look-up table associated with the electronic controller 140.

In step 158, the electronic controller 140 determines whether the rimpull torque demand from step 152 exceeds the rimpull torque limit from step 158. If the demanded rimpull torque does not exceed the limit, the process may return to step 152 and the demanded rimpull torque may be applied to the multi-speed transmission 130. If the demanded rimpull torque does exceed the torque limit, the electronic controller 140 acts to reduce the rimpull torque below the rimpull torque limit. One method for doing this is articulated in step 160, namely the electronic controller 140 may direct the multi-speed transmission 130 to shift to a lower gear in which the rimpull torque limit is higher than the current rimpull torque demand. As reflected in step 162, if the multi-speed transmission 130 is able to shift to a lower gear in which the rimpull torque limit is higher than the rimpull torque demand, then the process 150 may return to step 152 and the demanded rimpull torque may be applied to the multi-speed transmission 130. However, as previously noted, there may be occasions in which the multi-speed transmission 130 does not or cannot successfully shift to a lower gear. In such cases, as shown in step 164, the electronic controller 140 may limit the torque command to the electric motor 124 to a level below that of the rimpull torque limit for the gear in which the multi-speed transmission is operating.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An electric powertrain for driving a traction device of a machine comprising:
   an electric power source;
   an electric motor operably coupled to the electric power source;
   a multi-speed transmission operably coupled to the electric motor, the multi-speed transmission being operable to shift between a plurality of gears each configured to adjust an electric motor output speed and an electric motor output torque to a respective transmission output speed and transmission output speed range; and
   an electronic controller configured to:
      receive a first signal indicating rimpull torque demand of the electric powertrain, the rimpull torque demand having an associated electric motor torque command;
      receive a second signal indicating an operating gear in which the multi-speed transmission is operating;
      determine a respective rimpull torque limit for the operating gear of the multi-speed transmission;
      determine whether the rimpull torque demand exceeds the rimpull torque limit; and
      upon determining that the rimpull torque demand exceeds the rimpull torque limit, acting to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

2. The electric powertrain of claim 1, wherein the electric power source is a battery pack.

3. The electric powertrain of claim 1, wherein the rimpull torque limit is below an output torque capability of the electric motor.

4. The electric powertrain of claim 1, further including a differential operably coupled to the multi-speed transmission for distributing the torque produced by the electric motor to the traction device of the machine.

5. The electric powertrain of claim 1, further including an inverter configured to convert and control electricity supplied to the electric motor by the electric power source.

6. The electric powertrain of claim 5, wherein the controller is in communication with the electric motor, the multi-speed transmission and the inverter.

7. The electric powertrain of claim 1, wherein the electric motor is also configured to operate as a generator.

8. The electric powertrain of claim 1, wherein the rimpull torque limit for each operating gear is stored in the electronic controller.

9. The electric powertrain of claim 1, wherein at least a lowest gear of the multi-speed transmission does not have a rimpull torque limit.

10. A machine comprising:
    a machine frame;
    at least one traction device supported on the machine frame;
    an electric powertrain supported on the machine frame for driving the at least one traction device, the electric powertrain comprising:
       an electric power source;
       an electric motor operably coupled to the electric power source;
       a multi-speed transmission operably coupled to the electric motor, the multi-speed transmission being operable to shift between a plurality of gears each configured to adjust an electric motor output speed and an electric motor output torque to a respective transmission output speed and transmission output speed range; and
       an electronic controller configured to:
          receive a first signal indicating rimpull torque demand of the electric powertrain, the rimpull torque demand having an associated electric motor torque command;
          receive a second signal indicating an operating gear in which the multi-speed transmission is operating;
          determine a respective rimpull torque limit for the operating gear of the multi-speed transmission;
          determine whether the rimpull torque demand exceeds the rimpull torque limit; and
          upon determining that the rimpull torque demand exceeds the rimpull torque limit, acting to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

11. The machine of claim 10, wherein the electric power source is a battery pack.

12. The machine of claim 10, wherein the rimpull torque limit is below an output torque capability of the electric motor.

13. The machine of claim 10, further including a differential operably coupled to the multi-speed transmission for distributing the torque produced by the electric motor to the traction device of the machine.

14. The machine of claim 10, wherein the rimpull torque limit for each operating gear is stored in the electronic controller.

15. The machine of claim 10, wherein at least a lowest gear of the multi-speed transmission does not have a rimpull torque limit.

16. The machine of claim 10, further including a work tool supported on the frame so as to be movable relative to the frame.

17. The machine of claim 10, wherein the at least one traction device is a wheel.

18. A method for controlling an electric powertrain of a machine, the electric powertrain including an electric power source, an electric motor, and a multi-speed transmission operable to shift between a plurality of gears each configured to adjust an electric motor output speed and an electric motor output torque to a respective transmission output speed and transmission output speed range, the method comprising:

receiving a first signal indicating rimpull torque demand of the electric powertrain, the rimpull torque demand having an associated electric motor torque command;

receiving a second signal indicating an operating gear in which the multi-speed transmission is operating;

determining a respective rimpull torque limit for the operating gear of the multi-speed transmission;

determining whether the rimpull torque demand exceeds the rimpull torque limit; and upon determining that the rimpull torque demand exceeds the rimpull torque limit, acting to either (i) shift the multi-speed transmission to a gear in which the respective rimpull torque limit is at or above the rimpull torque demand or (ii) reduce the electric motor torque command to a level for which the rimpull torque is below the respective rimpull torque limit for the operating gear of the multi-speed transmission.

19. The method of claim 18, wherein the rimpull torque limit is below an output torque capability of the electric motor.

20. The method of claim 18, wherein at least a lowest gear of the multi-speed transmission does not have a rimpull torque limit.

* * * * *